Figure 1:
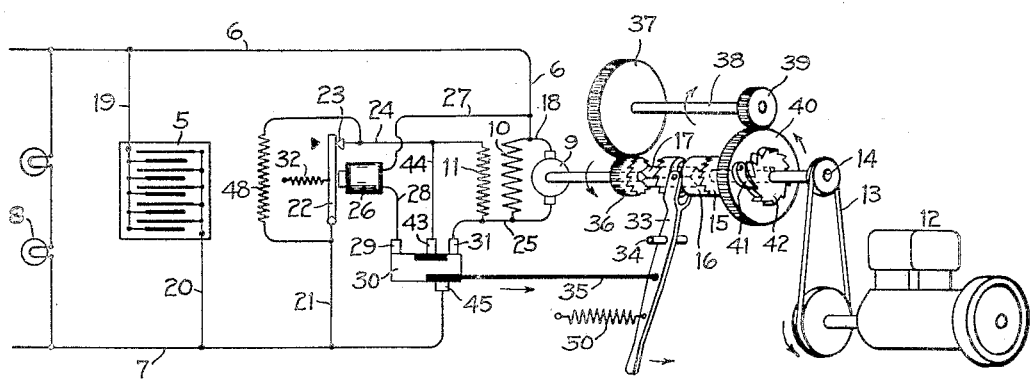

E. A. HALBLEIB & F. F. DORSEY.
STORAGE BATTERY SYSTEM.
APPLICATION FILED FEB. 8, 1913.

1,164,280.

Patented Dec. 14, 1915.

Witnesses:
Clarence W. Carroll
D. Gurnee

Inventor:
Edward A. Halbleib
Farnum F. Dorsey
by their attorneys
Osgood, Davis & Dorsey

UNITED STATES PATENT OFFICE.

EDWARD A. HALBLEIB AND FARNUM F. DORSEY, OF ROCHESTER, NEW YORK, ASSIGNORS TO NORTH EAST ELECTRIC COMPANY, OF ROCHESTER, NEW YORK, A CORPORATION OF NEW YORK.

STORAGE-BATTERY SYSTEM.

1,164,280.          Specification of Letters Patent.     Patented Dec. 14, 1915.

Application filed February 8, 1913. Serial No. 747,209.

*To all whom it may concern:*

Be it known that we, EDWARD A. HALBLEIB and FARNUM F. DORSEY, citizens of the United States, and residents of Rochester, in the county of Monroe and State of New York, have invented certain new and useful Improvements in Storage-Battery Systems, of which the following is a specification.

This invention relates to electric systems of the type in which a storage-battery is employed as a source of electricity for energizing electric lights, motors, or other translating-devices, the battery being charged by the operation of a direct-current electric generator. In systems of this type, particularly as employed upon railway-vehicles or automobiles, it is common to connect the battery and the generator in a charging-circuit through which current flows, from the generator, in a direction to charge the battery so long as a sufficient speed, with a corresponding electromotive force, is maintained in the generator by the source of power from which it is actuated. When the speed of the generator diminishes beyond a certain point, as the result of a diminution in the speed of the source of power, the electromotive force of the generator becomes less than that of the battery, and current then tends to flow in a reverse direction in the charging-circuit, causing the generator to operate, by virtue of its well-known reversible character, as a motor energized by the battery, without change in its direction of rotation. In fact, the generator is sometimes expressly employed, as in certain well known engine-starting systems, as a source of power when operating in this manner, constituting, thus, the translating-device for the energization of which the storage-battery is employed.

In systems of the type in question, especially where, as in the case of vehicles, the source of power operates at speeds which vary frequently and rapidly from nothing to a maximum, it is desirable, in order that waste of battery-energy may be avoided, to provide automatic means for preventing the return-flow of current in the charging-circuit when the speed, and the resulting electromotive force of the generator, fall below what is necessary to overcome the electromotive force of the battery. For this purpose it has been common to employ a reverse-current cut-out of well-known form, in which an armature is actuated by windings included in the charging-circuit.

One object of the present invention is to provide a battery-system of the type in question with means for automatically interrupting or cutting down the return-flow of battery-current, which shall be more positive in operation than the device just referred to; and to this end we make use of the tendency of the generator, when operating as a motor, to overrun the source of power by which it is normally actuated. Through suitable mechanical or electrical connections this overrunning action is made to result in the interposition, in the charging-circuit, of a resistance, either partial or complete, to the returning current. This feature of the invention may be employed in conjunction with various means for throwing the resistance out of the charging-circuit when the generator is operating at sufficient speed for charging, but it is preferably used in connection with the novel automatic device for this purpose hereinafter disclosed.

Another object of the invention is to provide a system of the type in question with novel and improved means operating automatically, when the generator attains sufficient speed as the result of its actuation by the source of power, to cut out a resistance which has previously been interposed in the charging-circuit to oppose the return-flow of current. To this end we employ means which are connected with the generator independently of the charging-circuit and which act, independently of the conditions therein, to throw out such resistance as the result of the attainment, by the generator, of a speed and a corresponding electromotive force sufficient to overcome the electromotive force of the battery. This second feature of the invention may be employed in conjunction with means of various kinds for throwing the resistance into the charging-circuit, but it is preferably used in combination with the novel automatic means for that purpose hereinbefore described.

Other objects of the invention, and the features of construction and arrangement by which the several objects are or may be attained, are set forth in the following description of the illustrated embodiment of the invention.

Figure 2:
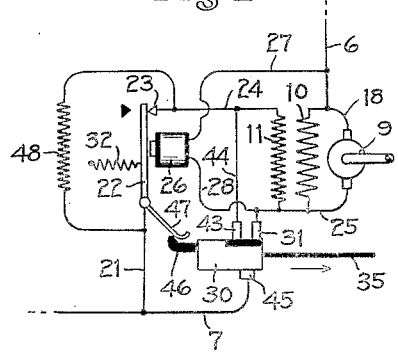

In the accompanying drawings:—Figure 1 is a diagram illustrating the invention as embodied in a storage-battery system in which the generator is employed as a means for starting an internal-combustion engine by which it is normally actuated; and Fig. 2 illustrates, diagrammatically, a modification in the apparatus of Fig. 1.

In the drawings a storage-battery 5 is conventionally indicated, the terminals of the storage-battery being connected with the main wires or conductors 6 and 7 of a load-circuit through which translating-devices, such as electric lights 8, may be supplied with current. The battery is charged by means of a compound-wound electric generator having an armature 9, a shunt field-winding 10 and a series field-winding 11. An internal-combustion engine 12 of conventional form is indicated as the source of power by which the generator is normally actuated. This engine is connected, through means such as a belt or chain 13, with a power-shaft 14 upon which is fixed a clutch-member 15 having inclined teeth, as shown in Fig. 1, so that it is adapted to transmit power only in one direction, viz: from the engine to the generator, the engine being adapted to operate in the direction indicated by the arrow in Fig. 1.

The engine-actuated clutch-member 15 is adapted to coöperate with a sliding clutch-member 16 having corresponding teeth at its right-hand end. The sliding clutch-member 16 is mounted loosely upon a squared portion 17 of the armature-shaft of the generator, so that it is compelled to rotate with the armature-shaft, but is free to slide thereon to permit it to be engaged with, or disengaged from, the clutch-member 15. The normal position of the parts is indicated in Fig. 1, the engine being thus adapted to rotate the armature-shaft and cause the generator to produce electricity for the purpose of charging the storage-battery and to assist in supplying the main-conductors 6 and 7.

The current produced in the armature of the generator flows through a wire 18, from which a part of it passes, through the wire 6, to a wire 19 by which the storage-battery is supplied during the recharging operation; and the charging-current returns from the storage-battery, through a wire 20, to the main wire 7. From the wire 7 the current returns to the generator by way of a circuit-breaker which constitutes a feature of the present invention. This circuit-breaker is indicated, diagrammatically, as having a movable contact-finger 22 coöperating with a fixed contact 23. When the circuit-breaker is in closed position, as illustrated in the drawings, the current returns through the wire 21, the contact-finger 22 and the fixed contact 23, and thence, through a wire 24, to the upper end of the series field-winding 11. At this time the current flows through the series field-winding in such a direction that the effect of this winding is opposed to that of the shunt field-winding 10. The shunt field-winding is supplied at all times with current from the armature 9, and its length and resistance are so proportioned to those of the series winding 11 that it has a preponderating effect. The series winding, however, acting in opposition to the shunt winding, has the effect of an automatic regulating device by which excessive production of current is prevented. This arrangement constitutes no part of the present invention and is illustrated merely to show a conventional, practically operative system. From the winding 11 the current returns, through a wire 27, to the negative terminal of the armature, thus completing the circuit through which the battery is recharged, or through which the generator may supply current to the translating-devices.

It has previously been proposed to employ an automatic circuit-breaker in the generator-circuit, as in the case of the circuit-breaker above described, but in such previous constructions this circuit-breaker has been operated in the manner of a polarized relay, or in other manners which it is not necessary to describe herein. In the present invention the circuit-breaker is operated and controlled in a novel manner, both to interrupt and to reëstablish the charging-circuit automatically in accordance with variations in the electromotive force of the generator. The contact-finger 22 is illustrated, diagrammatically, as constituting also the armature of an electromagnet 26, and this electromagnet is so connected with the generator as to be normally energized by current supplied thereby. In Fig. 1 the current flows through the wires 18 and 6, and through a wire 27 to the magnet 26, and thence, through a wire 28, to a fixed contact 29 constituting one of a series of fixed contacts coöperating with a movable contact-member 30. In the normal position of the parts current flows from the fixed contact 29, through the contact-member 30, to a fixed contact 31, and thence through a wire 25 back to the generator, the magnet 26 being thus connected in parallel with the shunt-winding 10 of the generator-field. In this arrangement the magnet 26 may also be energized by current from the storage-battery so long as the contact-finger 22 engages the fixed contact 23. The current from the battery flows, for this purpose, through a circuit including the wires 19, 6, 27, and 28, the contact-members 29, 30 and 31, the wire 25, the series field-winding 11, the wire 24, the contact-members 23 and 22, and the wires 21, 7 and 20. Accordingly, the contact-finger 22 is normally held firmly against the fixed contact 23. A spring 32 is connected, however, with the contact-finger, this spring being normally under tension and tending to move the contact-finger away from the fixed contact.

In accordance with the present invention the spring 32 is caused or permitted to move the contact-finger to open-circuit position whenever the generator armature tends to overrun the driving mechanism by which it is connected with the engine 12, in consequence of a reduction in the speed of the engine to a point at which the electromotive force produced by the generator is less than that of the storage-battery. In such a case current returns from the storage-battery through the same circuit by which the generator normally charges the battery, and the generator begins to operate as an electric motor. The armature-shaft then tends to rotate faster than the power-shaft 14, and, owing to the beveled form of the clutch-teeth on the clutch-members 15 and 16, this results in a left-hand movement of the member 16 upon the armature-shaft whereby the clutch-teeth become disengaged so as to permit the member 16 to rotate faster than the member 15. To render this movement of the clutch-member effective for the required purpose the clutch-member 16 is connected, by suitable mechanism, with the circuit-controller of which the movable contact-member 30 is an element. Such connections are illustrated, in Fig. 1, as comprising a lever 33, which is forked to engage an annular groove in the clutch-member 16 and is pivoted upon an axis 34. This lever is connected, by a rod 35, with the movable contact-member 30 of the circuit-controller, and when the disengaging movement of the clutch occurs the connections just described operate to move the contact-member 30 to the right of the position shown in Fig. 1. The effect of this movement is to disengage the contact-member 30 from the fixed contacts 29 and 31, and thereby break the circuit through the winding of the electromagnet 26.

When the electromagnet is deënergized, as just described, it releases the contact-finger 22, which is then immediately drawn away from the fixed contact 23 by the spring 32, and in this manner the charging-circuit between the generator and the storage-battery is interrupted, as well as the connections between the generator and the translating-devices. The return-flow of current from the storage-battery is thus discontinued immediately and automatically, and the overrunning movement of the generator ceases.

A spring 50, connected with the lever 33, tends to swing the lever back to the position of Fig. 1 so as to cause the clutch-members 15 and 16 to engage each other, and after the interruption of the return-flow of current, as above described, this spring acts immediately to reëngage the clutch-members. The generator then again begins to generate current of which the electromotive force depends upon the speed of the generator and the engine 12. So long as this speed continues insufficient to produce an electromotive force greater than that of the storage-battery the circuit-breaker remains in open-circuit position. Since the circuit-controller has been returned to normal position, however, by the return of the clutch-member 16 to operative position, the circuit is closed through the electromagnet 26, so that the magnet is energized by current from the generator. When the speed of the engine 12 rises again to the necessary degree the flow of current through the electromagnet becomes sufficient to overcome the spring 32, whereupon the magnet draws the contact-finger 22 again into engagement with the fixed contact 23, thus reëstablishing the charging-circuit between the generator and the battery.

In the arrangement above described the generator-armature itself constitutes, in effect, the primary means by which the charging-circuit is interrupted, this interruption occurring as the result of the tendency of the armature to overrun the source of power by which it is normally actuated. Consequently the action is much more positive and reliable than where it depends upon the delicate and sensitive action of polarized armatures and similar devices. The means by which the overrunning action of the armature is utilized for this purpose may be widely varied in construction and arrangement. In Fig. 1 these means are shown as operating in part electrically upon the contact-finger 22. In place of such an arrangement, however, the same effect may be produced by wholly mechanical means, a modification of the apparatus for this purpose being illustrated in Fig. 2. In this modified arrangement the return-wire 28 from the electromagnet 26 is not connected with the circuit-controller, but passes directly to the wire 25 and the generator-terminal. In this case the contact-finger is moved to open-circuit position by means of mechanism comprising a projection 46 from the circuit-controller, which engages an arm 47 on the contact-finger. When the contact-member 30 of the circuit-controller is moved to the right by the throwing-out action of the clutch-member 16, as above described, the parts 46 and 47 act to move the contact-finger 22 forcibly away from the electromagnet 26 and the fixed contact 23, thus breaking the charging-circuit and interrupting the return-flow of current from the storage-battery through both the generator and the electromagnet. In this modified arrangement the further operations of the apparatus are similar to those above described, the electromagnet operating to return the contact-finger 22 to closed-circuit position when the electromotive force of the generator rises sufficiently for the purpose.

The strength of the spring 32 may be so adjusted that there is a substantial difference between the electromotive force at which the charging-circuit is opened, and that at which it is closed, this arrangement having the advantage that it prevents the rapid recurrence of the automatic operations upon slight changes in speed in the engine and the generator.

While we have illustrated an engine as the source of power for actuating the generator, it will be understood that the arrangement, in so far as above described, is useful in systems wherein other sources of power are employed, as, for example, in lighting-systems upon railway vehicles, in which the source of power may be an axle of the vehicle as in various well known arrangements. The present invention has a particular utility, however, in connection with apparatus employed for the purpose of automatically starting an internal-combustion engine, such apparatus being illustrated, for example, in the pending application of Edward A. Halbleib, one of the present applicants, filed November 6, 1911, Serial No. 658,902. We have accordingly illustrated the present invention as embodied in such a system. The clutch-member 16 is provided, at its left-hand end, with another series of clutch-teeth which are adapted to coöperate with similar teeth on a clutch-member 36 which is mounted to rotate freely upon the armature-shaft. This latter clutch-member constitutes also one of a train of gears comprising also a gear 37 and a pinion 39 fixed on a countershaft 38. The pinion 39 meshes with a gear 40 which is mounted to rotate loosely upon the power-shaft 14. The gear 40 carries a pawl 41 which coöperates with a ratchet-wheel 42 fixed to the power-shaft. The direction of operation of the clutches and of the ratchet and pawl-mechanism is such that when the clutch-member 16 is moved to its extreme left-hand position, so as to engage the clutch-member 36, the generator, operating now as an electric motor, may drive the power-shaft 14 through the speed-reducing gearing and thus supply power for rotating the engine-shaft in a direction to start the engine from a position of rest. As soon as the engine begins to operate under its own power, however, the ratchet-and-pawl mechanism permits the power-shaft to overrun the gear 40, so that the power-shaft may then actuate the armature-shaft, in the manner hereinbefore described, independently of the speed-reducing gearing.

To control the apparatus for starting the engine the lever 33 may be employed as a manually-operable device for shifting the clutch-member 16; and during this starting-operation the circuit-controller above described has the further function of controlling the electric circuits to permit current from the storage-battery to return through the generator to operate the generator as a motor. The electrical connections by which this is accomplished are similar to those disclosed in said application. The wire 7 is extended into connection with a fixed contact 45, and coöperates with the lower surface of the movable contact-member 30, while still another fixed contact 43 coöperates with its upper surface. When the lever 33 is moved manually to the right, beyond the position to which it may be automatically moved by the overrunning-action above described, the contact-member 30 is brought to a position in which it connects the fixed contacts 45 and 43. This results in short-circuiting the circuit-breaker so that, regardless of the operation of the contact-finger, current can flow freely from the storage-battery, first through the wires 19, 6 and 18, and through the armature and the shunt field-winding of the generator, and thence back, through the wire 25, the series field-winding 11 and the wire 24, to a wire 44 connected with the fixed contact 43, and the current then flows through the contact-members 30 and 45, and through the wires 7 and 20, back to the battery. As in said application, the last part of the movement of the lever 33 and the circuit-controller has the further action of short-circuiting the series-winding 11, since it brings the left-hand end of the contact-member 30 into simultaneous engagement with the fixed contacts 31 and 45, and thus permits current to flow directly from the fixed contact 31 through the contact-member 30 to the fixed contact 45, the object of this final operation being to reduce the strength of the generator field for the purpose of obtaining a higher speed of rotation, all as set forth in said application.

It will be apparent that the present invention is particularly adapted for employment in connection with an engine-starting apparatus such as that described, for the reason that the electrical and mechanical operations by which the circuit-breaker are controlled are conveniently and simply effected through the operation of the same clutch-mechanism by which the starting operation is caused to occur, and thus a reliable automatic device for controlling the return-flow of battery-current is produced with a simple arrangement of circuits and of mechanism.

While the circuit-breaker may be arranged to completely interrupt the charging-circuit between the generator and the storage-battery, it is preferable to permit, at all times when the battery is not being recharged, a slight return-flow of current from the battery, both because this tends to improve the operation of the battery and also because it maintains the generator-field in a slightly magnetized condition and enables the generator to take up its load more quickly when thrown into operation. Accordingly, we have shown a shunt-circuit around the contact-devices of the circuit-breaker, passing through a high-resistance coil or equivalent device 48. This arrangement constitutes no part of the present invention, but it will be understood that in the following claims, when we speak of the circuit-breaker as introducing resistance into the charging-circuit, we have reference to an arrangement in which such resistance may be either the complete or prohibitive resistance due to the air-gap or complete break in the charging-circuit produced by the action of the circuit-breaker, or to the lower resistance of the shunt-circuit just described, since the effect, in either case, is to substantially reduce the return-flow of current from the battery through the generator.

While the illustrated apparatus is adapted, as above described, to perform automatically both the interruption and the reëstablishment of the charging-circuit, the means by which these two operations are performed are so far independent of each other that either of them may be employed alone, or in conjunction with some other means for performing the contrary operation. That is to say, the means by which the circuit is interrupted through the overrunning action of the generator are not necessarily associated with the electromagnetic means described for returning the circuit-closer to closed position, and, on the other hand, such electromagnetic means may be usefully employed in the absence of the automatic means described, or any other automatic means, for breaking the charging-circuit. In the preferred embodiment of the invention, however, these automatic means are used in conjunction since they produce, as above stated, a complete apparatus or system which is very simple in construction and arrangement and reliable in operation.

Our invention is not limited to the embodiment thereof hereinbefore described and illustrated in the accompanying drawings, but may be embodied in various other forms within the nature of the invention as it is defined in the following claims.

We claim:—

1. The combination, with an electric generator, a storage-battery, a source of power, and mechanical connections, between the generator and the source of power, including a one-way clutch of which the coöperating elements have a relative disengaging-movement as the result of a tendency in the generator to overrun the source of power; of a circuit-breaker; conductors connecting the generator, the storage-battery and the circuit-breaker in a normally-closed charging circuit; and connections between the clutch and the circuit-breaker whereby the circuit-breaker is caused to move to open position and interpose resistance to the return-flow of current through said circuit, in consequence of said relative movement of the clutch-elements.

2. The combination, with an electric generator, a storage-battery normally connected in circuit with the generator and charged thereby, and a source of power for actuating the generator; of mechanical connections between the source of power and the generator, said connections being adapted to yield when the generator, in consequence of return-flow of current from the battery, tends to overrun the source of power; circuit-controlling means operating, in consequence of such yielding movement, to automatically interpose resistance, in the charging circuit, to such return-flow of current; and electromagnetic means, energized by the generator independently of the charging-circuit and adapted, upon the attainment of a predetermined electromotive force in the generator greater than that of the battery, to cause said circuit-controlling means to cut out said resistance.

3. The combination, with an electric generator, a storage-battery, and a source of power; of mechanical connections between the source of power and the generator, said connections being adapted to yield when the generator tends to overrun the source of power; a circuit-breaker and conductors connecting it, in a charging-circuit, with the generator and the storage battery; means adapted to move the circuit-breaker automatically to open-circuit position in consequence of such yielding movement in said mechanical connections; and means for returning the circuit-breaker automatically to closed position upon the attainment of a predetermined speed in the generator.

4. The combination, with a storage-battery, an electric generator, a circuit-breaker, conductors normally connecting these parts in a charging-circuit, a source of power for actuating the generator, change-speed gearing for connecting the generator with the source of power, said gearing comprising a one-direction clutch, and a circuit-controller controlling a short-circuit around said circuit-breaker; of mechanism, connecting said gearing and said circuit-controller, whereby movement of the circuit-controller toward closed-circuit position results in throwing out the one-direction clutch, and vice versa;

and means actuated automatically, by the throw-out action of the clutch in consequence of a tendency in the generator to overrun the source of power, to cause the circuit-breaker to move to open-circuit position before the circuit-controller reaches closed-circuit position.

5. The combination, with a storage-battery, an electric generator, and an engine; of clutch-mechanism for connecting the generator and the engine, said mechanism being operable, in different positions, to permit the engine to actuate the generator or to permit the generator to actuate and start the engine, and including, for the former purpose, a one-direction clutch having an automatic throw-out movement when the generator overruns the engine; a circuit-breaker, conductors connecting it, in a charging-circuit, with the generator and the battery, a circuit-controller connected in shunt around the circuit-breaker, mechanical connections between the clutch-mechanism and the circuit-controller whereby they may be actuated simultaneously to cause the starting of the engine and whereby the circuit-controller may be actuated automatically in consequence of the throw-out action of said one-direction clutch; and means for actuating the circuit-breaker, said means operating under the control of the circuit-controller, when it is actuated automatically as aforesaid, to introduce resistance into the charging-circuit when the generator overruns the engine.

EDWARD A. HALBLEIB.
FARNUM F. DORSEY.

Witnesses:
L. THON,
D. GURNEE.